(12) United States Patent
Righi et al.

(10) Patent No.: US 8,066,604 B2
(45) Date of Patent: Nov. 29, 2011

(54) ARTICULATED CHAIN FOR DRIVE TRANSMISSION IN BICYCLES

(75) Inventors: Ermanno Righi, Modena (IT); Sandro Montanari, Formigine (IT)

(73) Assignee: F.S.A. S.R.L., Busnago (IT)

( * ) Notice: Subject to any disclaimer, the term of this patent is extended or adjusted under 35 U.S.C. 154(b) by 392 days.

(21) Appl. No.: 10/577,464

(22) PCT Filed: Oct. 12, 2004

(86) PCT No.: PCT/IB2004/003323
§ 371 (c)(1),
(2), (4) Date: Mar. 14, 2007

(87) PCT Pub. No.: WO2005/043005
PCT Pub. Date: May 12, 2005

(65) Prior Publication Data
US 2007/0243963 A1    Oct. 18, 2007

(30) Foreign Application Priority Data
Oct. 30, 2003 (IT) .............................. MO2003A0295

(51) Int. Cl.
*F16G 15/00* (2006.01)
(52) U.S. Cl. ........ 474/231; 474/206; 474/210; 474/219; 474/228
(58) Field of Classification Search .................. 474/206, 474/210, 219, 228, 231
See application file for complete search history.

(56) References Cited

U.S. PATENT DOCUMENTS

| 1,945,357 | A | * | 1/1934 | Pierce ............................ 474/210 |
| 2,277,915 | A | * | 3/1942 | Klaucke ......................... 474/210 |
| 3,093,235 | A | * | 6/1963 | Imse .............................. 198/852 |
| 4,265,134 | A | * | 5/1981 | Dupoyet ........................ 474/231 |
| 5,288,278 | A | * | 2/1994 | Nagano .......................... 474/228 |
| 5,322,483 | A | * | 6/1994 | Wang ............................. 474/206 |

FOREIGN PATENT DOCUMENTS

| EP | 0 494 670 | 7/1992 |
| EP | 0 666 434 | 8/1995 |
| JP | 60 093017 | 5/1985 |

* cited by examiner

*Primary Examiner* — Robert Siconolfi
*Assistant Examiner* — James Hsiao
(74) *Attorney, Agent, or Firm* — Pearne & Gordon LLP

(57) ABSTRACT

The chain comprises a plurality of external links (2), each defined by a pair of parallel external plates (4, 5) and by two rotation pivots (6) interpositioned between the two external plates (4, 5). The chain also comprises a plurality of internal links (3), each defined by a pair of parallel internal plates (7, 8) and by two bushes (9) interpositioned between the plates and each internal link (3). Each of the rotation pivots (6) is inserted coaxially in a bush (9) and so defines an alternated succession of external links (2) and internal links (3) and defines with the bush (9) a spherical coupling surface. The chain also comprises anti-rotation elements (12) for reducing a possibility of rotation with respect to an alignment direction of each pair of adjacent links (2, 3).

21 Claims, 3 Drawing Sheets

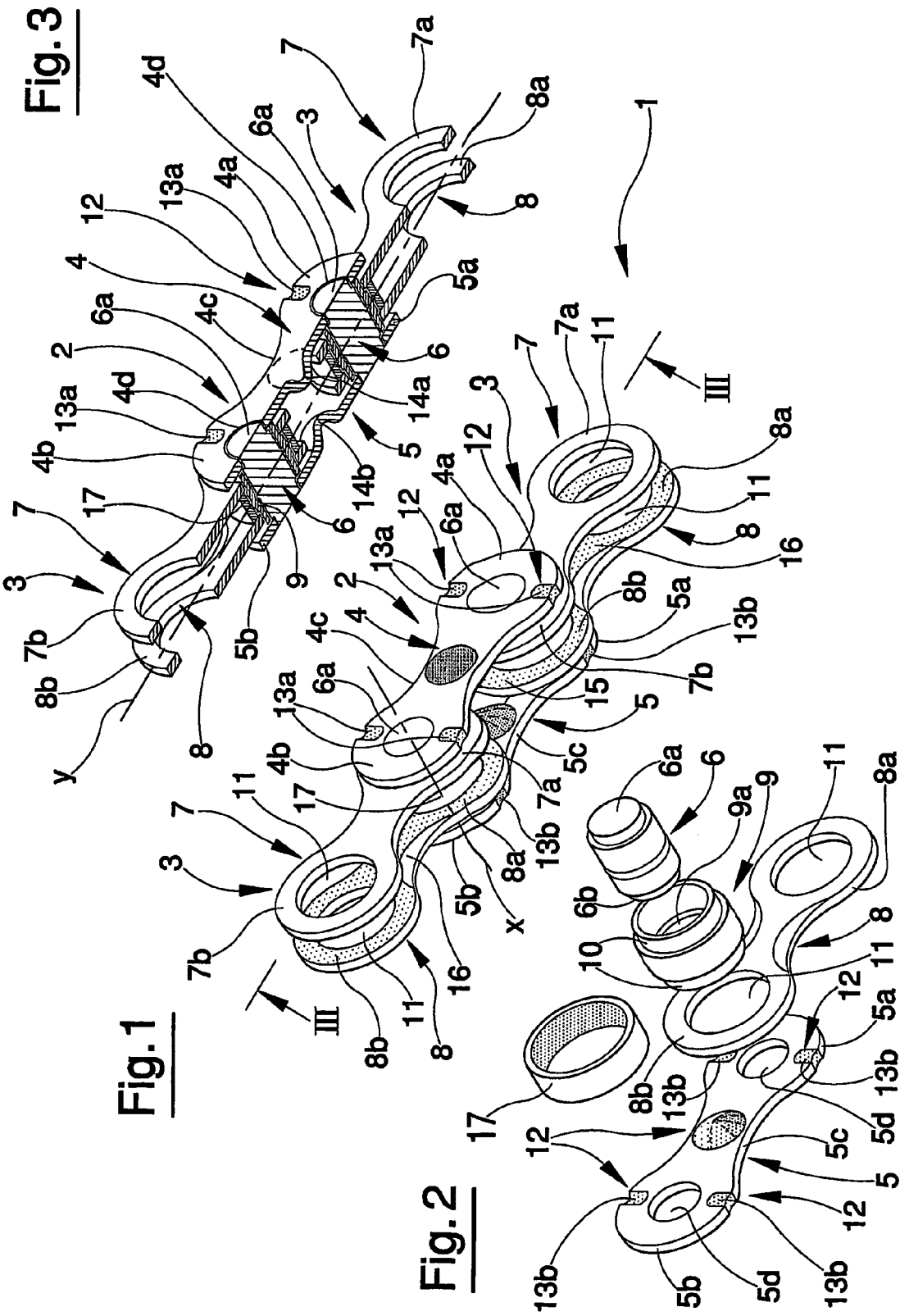

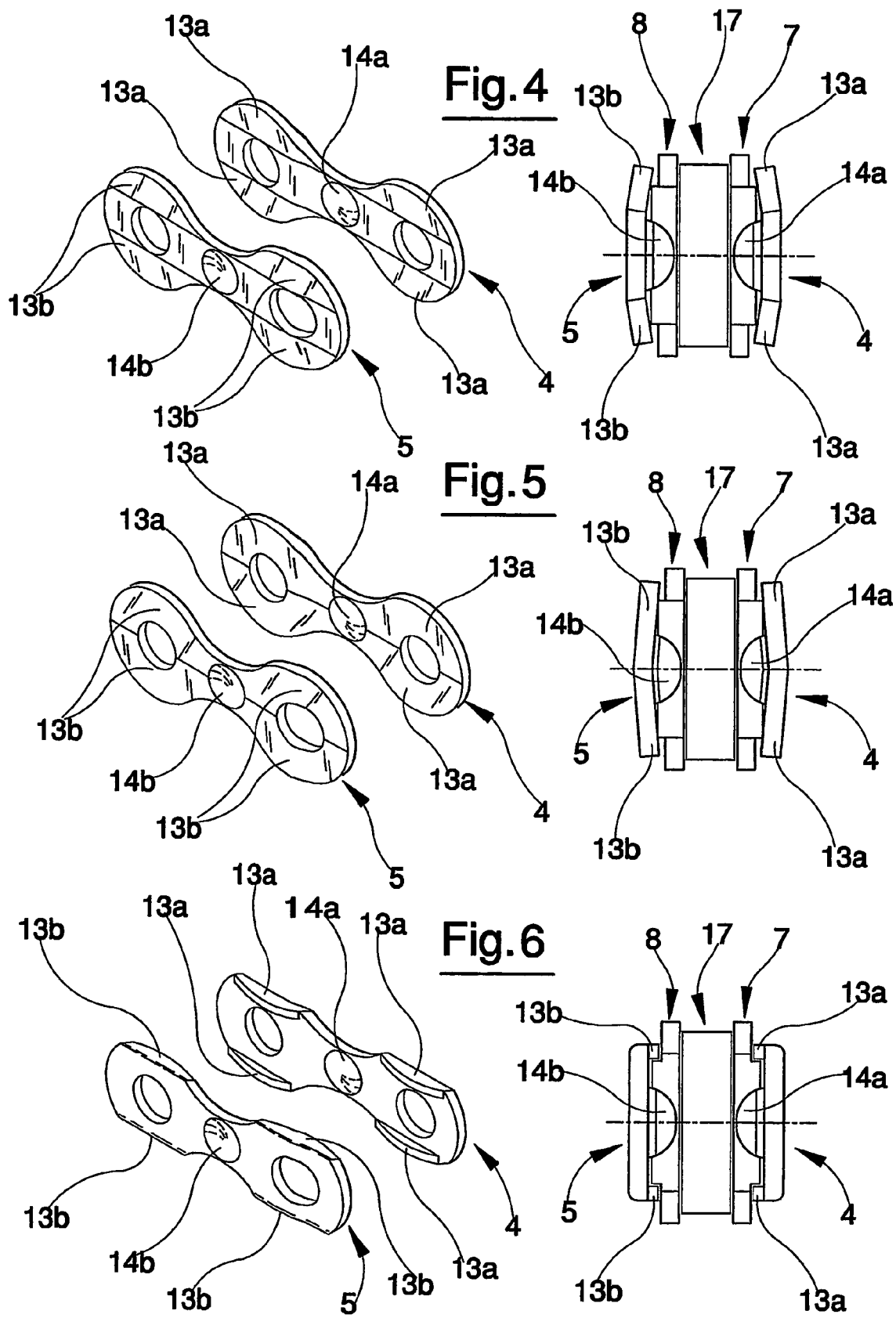

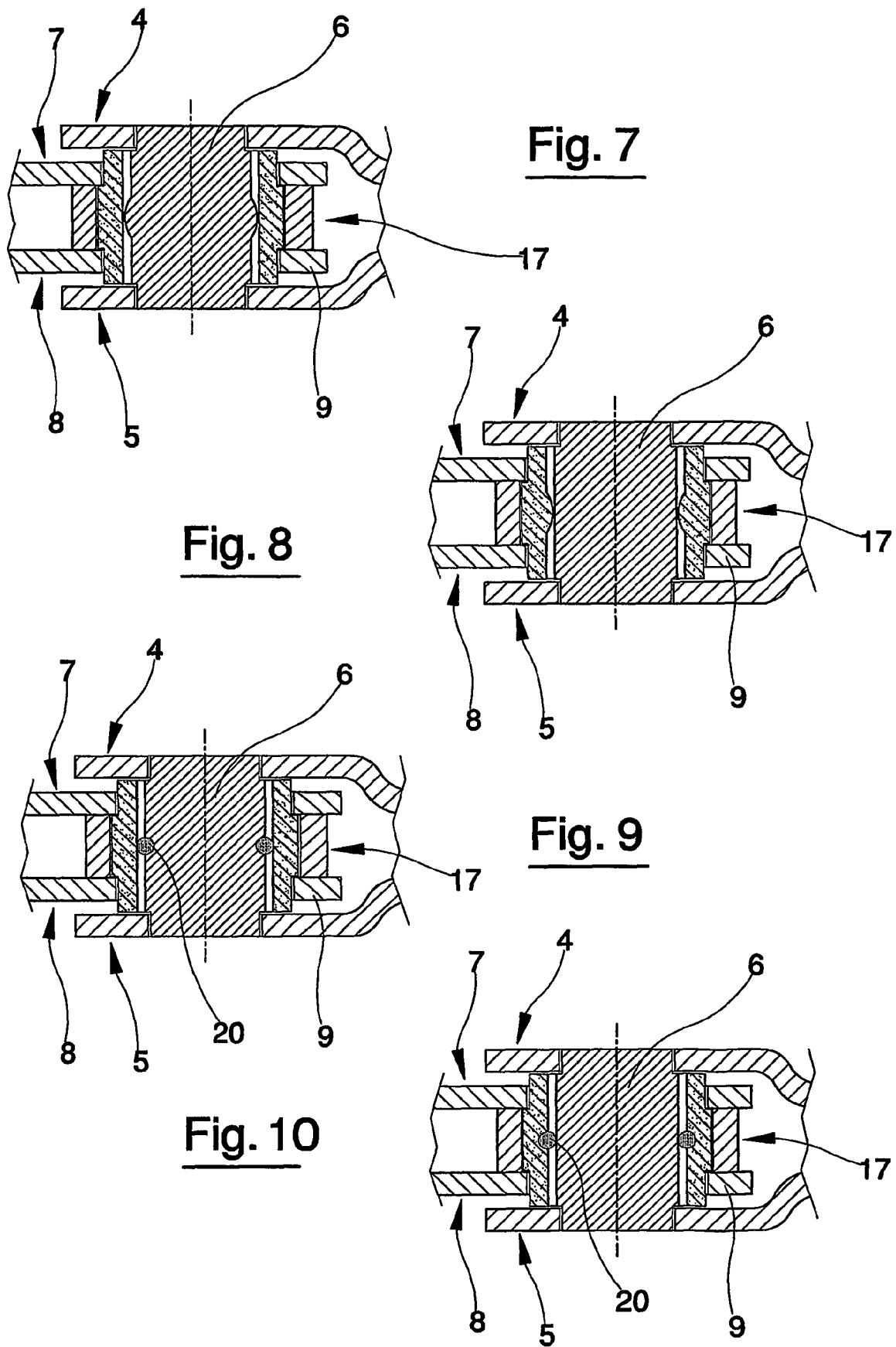

ARTICULATED CHAIN FOR DRIVE TRANSMISSION IN BICYCLES

TECHNICAL FIELD

The invention relates to an articulated chain for drive transmission in bicycles.

BACKGROUND ART

As is known, the chains usually used for bicycle transmissions are composed of articulated links. The links are made up of parallel bushes mounted rotatingly on cylindrical pivots. Each bush is solidly connected at each end thereof to a plate, and each pivot is solidly connected at each end thereof to another plate. The pivot exhibits a greater length than the bush, and the two plates connected to the bush are in an internal position with respect to the two plates connected to the pivot, in order that the first end of the plates connected to the bush is superposed on the second end of the plates connected to the pivot. A further bush is solidly connected to the second end of the internal plates; a further pivot is housed internally of the further bush, which pivot is solidly connected to the first ends of two further external plates, defining a complete internal chain link.

Similarly, an external link is defined by two pivots connected at the two ends thereof respectively to the first and the second ends of two external plates, so that the chain is closed by alternatingly connecting numerous internal links to numerous external links. In order to prevent scraping between the chain and the cogwheels on which the chain is mounted, the prior art teaches rotating rollers coupled externally to the bushes, or rotatingly engaging the bushes to the internal plates so that they take on a direct roller function.

Thanks to the rotating coupling between pivots and bushes, each link is free to rotate with respect to the contiguous links on a perpendicular plane to the longitudinal axes of the pivots, enabling the chain to transmit drive between pairs of cogwheels of different dimensions.

The two wheels between which drive is transmitted may not be perfectly coplanar, i.e. because the chain is mounted on bicycles having known systems for gear couple variations between driven cog, or pinion, and drive cog, known as the crown wheel, in which the chain is made to translate transversally on several concentrically-arranged cogwheels. In these geared systems, the chain must be provided with a certain degree of transversal deformability. In traditional chains this deformability is achieved by including a predetermined degree of play in the coupling between each pivot and the bush in which the pivot is housed. Thanks to this play, the pivot can shift into an inclined position with respect to the bush it is housed in. In this way, each internal link, apart from being free to rotate longitudinally with respect to the two contiguous external links on a perpendicular axis to the pivot axes, can also rotate transversally, within certain limits, on a plane containing the longitudinal axis of the pivot belonging to a contiguous external link. In the rotated configuration, the contact between the pivot and the corresponding bush is no longer distributed along a straight line, but is rather concentrated at certain points, giving rise to very high pressures which can lead to considerable problems of wear.

Furthermore, in the tracts where the chain is enmeshed with the cogwheels it is aligned and has the links thereof arranged at a standard distance between one another, due to the coupling between each bush on the chain and the recess between each cog on the cogwheel. Therefore the de-alignment between the external links occurs brusquely at the moment where the links leave the cogwheel, which moment also includes the utilisation of the play in the chain between the pivots and bushes—and the play is taken in equally brusquely when the chain links enter the cogs on the gearing cogwheels and re-aligns.

These sharp changes of link configuration create a certain level of noise in the transmission, and accentuate wear on the parts in relative motion. This wear also increases the degree of play between the pivots and the bushes, so that the bushes become able to assume even more inclined positions with respect to the bushes. The inclinations bring the internal links to exert a lever action on the external links they are connected to, and in effect push the external links further outwards. This can end with the external links becoming detached from the pivots, causing the chain to break.

To overcome these drawbacks, and especially to enable transversal inclinations greater than those that can be obtained with traditional chains, while eliminating the play between pivot and bush and therefore shocks, and ensuring that contact between the bushes and pivots always occurs along a surface even when the chain is not working axially, thus obtaining a more silent and less wearing operation, the present applicant, in a previous patent application, proposed a new and original technical solution consisting in defining, between each bush and respective pivot, a spherical reciprocal coupling surface for enabling a rotation between two adjacent links about perpendicular axes to a corresponding main rotation axis.

The longitudinal axis of each pivot and the longitudinal axis of each bush, which in reciprocal alignment identify the main rotation axis, are free to rotate reciprocally about the centre of the spherical coupling surface. This freedom of movement is translated into the possibility of rotation and inclination with respect to the longitudinal direction of alignment of one link to another according to an angle which can exceed four degrees and which can in any case be defined during the design stage by suitably sizing the elements constituting the chain.

In other words, for each pair of contiguous external and internal links, thanks to the presence of the spherical contact and coupling surface between each pivot and the corresponding bush, both reciprocal torsional rotation, about a rotation axis which coincides with a longitudinal alignment axis of the ling couple, and reciprocal transversal rotation, about a transversal rotation axis which is perpendicular to the longitudinal plane containing the main rotation axis, are possible.

The prior art, as summed-up above, includes some limitations and drawbacks. In particular, the rotation possibility between each contiguous pair of links, as described above, is useful in some industrial applications, where it is necessary to transmit drive between cogwheels with skewed axes, but when applied to bicycles it can give rise to snagging between the chain and cogwheels at the moment where each cog inserts in the little space between two rollers and the respective internal or external plates; this is because each of the spaces may be imperfectly aligned with the cog.

This snagging phenomenon, which causes a drop in pedalling fluency when occurring in bicycles, emerges most frequently during gear changing, i.e. when the chain is caused to translate transversally from one gearing cogwheel to another.

However, even during normal power drive transmission, when the chain is not subject to changing from one gearing to another, the cogwheels may not be coplanar and since the spaces formed by the external links are slightly wider than the spaces defined by the internal links, with a consequently greater cog-space play in the external links, a certain degree of irregularity is present in the orientation, and there is a continuous slight transversal oscillation of the chain due to the alternation of successive insertions and removals of the cogs into and out of the non-uniformly-wide spaces.

It is also worth noting that the slight transversal oscillations of the chain may induce torsional rotations, and therefore may accentuate the problems caused thereby, as has already been mentioned.

The technical aim of the present invention is therefore to provide an articulated chain which obviates the above-described drawbacks.

An important aim of the invention is to provide an articulated chain for bicycles in which each bush and respective pivot exhibit a spherical coupling surface, which surface functions more regularly and with lower friction than prior-art surfaces, especially during stages of transfer of the chain from one cogwheel to another and during work done in highly-inclined configurations.

The specified aim 1s attained by a an articulated chain which is characterised in that it comprises one or more of the technical solutions claimed herein below.

DISCLOSURE OF INVENTION

The invention will now be described by way of non-limiting example in a preferred embodiment of an articulated chain according to the invention, illustrated by way of non-limiting example in the accompanying figures of the drawings, in which:

FIG. 1 is a perspective view of some links of an articulated chain according to the invention;

FIG. 2 is a perspective and exploded view of some components of the chain of FIG. 1;

FIG. 3 is a section according to line III-III of FIG. 1;

FIGS. 4, 5, 6 show three constructional variations of an element of the chain;

FIGS. 7, 8, 9, 10 show four constructional variations of due elements of the chain.

With reference to the figures of the drawings, 1 denotes an articulated chain according to the present invention.

The articulated chain 1 comprises a first plurality of links which will hereinafter be defined as external links 2 because of their arrangement, and a second plurality of links, or internal links 3, which are rotatably and consecutively connected about respective main axes of rotation X, which are axes of rotation of a link with respect to a next link when the two links lie in a same plane.

More precisely, as clearly illustrated in FIG. 1, the chain 1 is formed by an alternating succession of external links 2 and internal links 3.

In particular, each of the external links 2 exhibits a first external plate 4 having a first end 4a and a second end 4b and a second external plate 5, parallel to the first external plate 4 and having a first end 5a and a second end 5b.

The two external plates 4 and 5 of each first link 2 are solidly connected by two rotation pivots 6 interpositioned between the first and second external plates 4, 5 at the first ends 4a, 5a and the second ends 4b, 5b thereof.

In particular, the two external plates 4, 5 exhibit a same double-lobed shape and are provided with an end hole 4d, 5d at each lobe into which ends 6a, 6b of each pivot 6 will insert.

Similarly, each internal link 3 exhibits a first internal plate 7 having a first end 7a and a second end 7b, and a second internal plate 8 parallel to the first internal plate 7 and having a first end 8a and a second end 8b.

The internal plates 7, 8 of the internal link 3 exhibit a double-lobed shape. In an intermediate portion comprised between the two lobes, the plates 7, 8 exhibit a bevelling which has the effect of thinning down the section thereof in proximity of the edge, which has the effect of improving the enmeshing of the chain with the cogs. The first and second internal plates 7, 8 of each internal link 3 are reciprocally coupled through two bushes 9 interpositioned between the first ends 7a, 8a, and the second ends 7b, 8b.

More precisely, with reference to FIG. 2, the bush 9 exhibits two collars 10 which can be inserted in special holes 11 afforded in the first ends 7a, 8a and the second ends 7b, 8b.

Each of the rotation pivots 6 belonging to the external links 2 is inserted coaxially in a respective bush 9, to define an alternated succession of external links 2 and internal links 3 (FIG. 1) which are rotatably and consecutively connected about respective main rotation axes X.

Each pivot 6 projects from the respective bush 9 at ends 6a, 6b of the pivot 6, and the bush 9 remains comprised between the plates 4, 5 of the external link 2. Advantageously, each rotation pivot 6 exhibits a barrel shape having a spherical profile and the bush 9 exhibits a seating a having a barrel-shaped spherical shape which is complementary to the profile of the pivot 6.

Each of the pivots 6 defines, with the respective bush 9, a spherical coupling surface, which allows not only rotation about the main rotation axis X but also a rotation between two adjacent links about perpendicular axes to the main rotation axis X.

Each of the bushes 9 is free to rotate between two extreme positions on any plane containing the longitudinal axis of the pivot 6 it is mounted on.

In particular, the spherical coupling surface allows a disalignment between the longitudinal axis of the pivot 6 and the longitudinal axis of the respective bush 9 which, in the position of reciprocal alignment, identifies the main rotation axis X.

The longitudinal axis of the pivot 6 and the longitudinal axis of the bush 9 are free to rotate reciprocally about the centre of the spherical surface.

The freedom of movement is in fact a freedom to rotate and to incline, with respect to the alignment direction, of one link with respect to a contiguous link, according to an angle α lying on a perpendicular plane to the longitudinal axis Y. The chain 1 comprises anti-rotation elements 12 which reduce the possibility of rotation with respect to the longitudinal direction of alignment of each pair of adjacent links 2, 3.

More precisely, the anti-rotation elements 12 comprise, in turn, spacers 13a, 13b interpositioned between the external plates 4, 5 of each external link 2 and the internal plates 7, 8 of each internal link 3 at the respective ends 4a, 5a, 7b, 8b and 4b, 5b, 7b and 8b.

The spacers 13a, 13b reduce the possibility of reciprocal torsional rotation between each consecutive pair of external links 2 and internal links 3 about a longitudinal axis y of alignment of the pair of links which is perpendicular to the corresponding main rotation axis X.

Furthermore, the spacers 13a, 13b comprise, for each main rotation axis X, a first pair of spacers 13a interpositioned between the first external plate 4 and the first internal plate 7 and a second pair of spacers 13b interpositioned between the second external plate 5 and the second internal plate 8.

Both the spacer elements 13a of the first pair and the spacer elements 13b of the second pair are arranged in proximity of the edges of the respective external plates 4, 5 and internal plates 7, 8 in a position which is symmetrically opposite to the longitudinal axis Y of the corresponding link.

For correct chain operation, it is sufficient that the spacers 13a and 13b comprise, for each main rotation axis X, a first spacer 13a interpositioned between the first external plate 4 and the first internal plate 7 and a second spacer 13b interpositioned between the second external plate 5 and the second internal plate 8. The first spacer 13a and the second spacer 13b are in this case arranged in proximity of the edges of the respective external and internal plates and are aligned along a straight line parallel to the corresponding main rotation axis X. Each spacer 13a 13b has a convex conformation, with a spherical profile, and is obtained by plastic deformation of an edge zone of the external plate 4, 5 or the corresponding internal plate 7, 8. The plastic deformation can be localized, producing a shaped surface as illustrated in FIGS. 1, 2 and 3, or it can be a fold in the edge itself, which has the effect of raising an edge zone of the plate with respect to the surface of the plate itself, as illustrated in FIGS. 4, 5 and 6.

Alternatively, each spacer 13a, 13b can be defined by a shaped element connected to an edge zone of the corresponding external plate 4, 5 or internal plate 7, 8. The shaped element can be realised in various materials, according to the desired resistance characteristics and friction coefficient.

The spacers 13a, 13b in effect reduce the play between the external plates 4, 5 and the internal plates 7, 8 in a perpendicular plane to the longitudinal axis y passing through the main rotation axis X, and strike against the external faces of the internal plates 7, 8, limiting transversal rotation only when a reciprocal rotation movement between adjacent external and internal links occurs.

Thanks to their position, the spacers 13a and 13b do not limit transversal rotation between two adjacent links, which are the rotations that permit the chain to deform transversally, a necessary condition when the cogwheels the chain is wound around are not coplanar. Also, the presence of the spacers 13a and 13b constitutes a precise reference for the relative positions between each pivot 6 and bush 9 in the direction of the respective main rotation axis X. Thus no other reference elements are necessary to perform this function, considerably simplifying chain assembly operations. In greater detail, the presence of the anti-rotation elements 12 means that only one of the pivot 6 and the bush 9 in each coupling need be provided with a spherical profile. In a first embodiment, each rotation pivot 6 exhibits a barrel-shape having a spherical profile, and the respective bush 9 exhibits a seating a having a straight profile. In a second embodiment each bush 9 exhibits a seating a having a spherical profile that projects in an internal direction and the respective pivot 6 exhibits a straight cylindrical shape having a straight profile. The spherical profile can be directly afforded on the surface of each rotation pivot 6 or each bush 9, as illustrated in FIGS. 7 and 8, or it can be defined by an annular element 20 associated to each rotation pivot 6 or each bush 9.

Advantageously the anti-rotation elements 12 further comprise swells 14a, 14b, which are respectively solidly constrained to the external plates 4,5 or each external link 2 and are arranged centrally on the external links 2.

The swells 14a, 14b project internally of a chamber 15 comprised between the external plates 4, 5, and are of a size which is sufficient to reduce the breadth of the chamber 15 in central portions 4c, 5c of the external plates 4, 5 to the breadth of a like chamber 16 comprised between the internal plates 7, 8.

The swells 14a, 14b also exhibit a convex conformation, with a spherical profile, and are obtained by plastic deformation of the central portions 4c, 5c of the external plates 4, 5. Alternatively the swells 14a, 14b can be obtained by etching and plastic deformation of central portions 4c, 5c of the external plates 4, 5, creating small tabs projecting from the external plates 4, 5.

In a further embodiment, the swells 14a, 14b are defined by shaped elements, which can be made of various materials, connected to central portions 4c, 5c of the external plates 5.

The swells 14a, 14b guide the entrance of the cogs of a cogwheel into the chambers 15 of the external links 2, limiting the play of the cogs with the internal faces of the external plates 4, 5 to levels which are similar to the play on the internal links 3.

Finally, to reduce relative dragging between the bushes 9 and the cogwheels, rotatable rollers 17 are included, rotatingly coupled externally of the bushes 9.

The invention offers important advantages.

The anti-rotation elements arranged on the external plates and at the ends and central part thereof limit or rather enable a precise definition at the design stage of the torsional rotation between the links of an articulated chain according to the invention; this has the effect of rendering the positioning of each chamber of the chain precise and regular at the moment in which each cog of a cogwheel inserts into the chamber, resulting in a cogwheel-chain coupling that is more fluid and free of snagging.

The anti-rotation elements are arranged centrally on the external links and thus make the play between the cogs and the external plates of the external links equal to the play between the cogs and the internal plates of the internal links. This considerably smooths disalignments that occur brusquely when the links exit the cogwheels and re-alignments that take place when the links enter the cogs of the gear wheels.

Finally, the greater regularity of the chain motion is very useful in improving the precision of the derailments required for gear changes involving cogged gearing wheels.

The invention claimed is:

1. An articulated chain for drive transmission in bicycles, comprising:

a plurality of external links (2) each of which exhibits at least a first external plate (4) having a first end (4a) having an upper end portion and a lower end portion and a second end (4b) having an upper end portion and a lower end portion, and a second external plate (5), parallel to the first external plate (4) and having a first end (5a) having an upper end portion and a lower end portion and a second end (5b) having an upper end portion and a lower end portion;

a plurality of rotation pivots (6) interpositioned between the first external plate (4) and the second external plate (5) of each external link (2) in positions at the first ends (4a, 5a) and the second ends (4b, 5b) of the respective first external plate (4) and the second external plate (5);

a plurality of internal links (3), each of which internal links (3) exhibits at least a first internal plate (7) having a first end (7a) having an upper end portion and a lower end portion and a second end (7b) having an upper end portion and a lower end portion and a second internal plate (8), parallel to the first internal plate (7) and having a first end (8a) having an upper end portion and a lower end portion and a second end (8b) having an upper end portion and a lower end portion; and a plurality of bushes (9) interpositioned between the first internal plate (7) and the second internal plate (8) of each internal link (3) at the first ends (7a, 8a) and the second ends (7b, 8b) thereof, each of the rotation pivots (6) being inserted coaxially into a bush (9) of the plurality of bushes (9), for defining an alternating succession of the external links (2) and the internal links (3) which are rotatably and consecutively connected about respective main rotation axes (X), each upper end portion of each end of each internal and external plate being above where a pivot (6) joins or passes through an end and each lower end portion of each end of each internal and external plate being below where a pivot (6) joins or passes through an end, a spacer (13a, 13b) being provided (a) where each upper end portion of an external plate is adjacent an upper end portion of an internal plate and (b) where each lower end portion of an external plate is adjacent a lower end portion of an internal plate, each spacer (13a, 13b) being selected from the group consisting of (a) a protuberance extending from an end portion of an internal plate toward one or more locations within the periphery of an end portion of an external plate or from an end portion of an external plate toward one or more locations within the periphery of an end portion of an internal plate, or (b) an end portion of an external plate being bent out of the plane of the external plate toward the adjacent end portion of an internal plate or an end portion of an internal plate being bent out of the plane of the internal plate toward the adjacent end portion of an external plate;

the spacers (13a, 13b) reducing a possibility of torsional rotation between each pair of external links (2) and internal links (3) about a longitudinal alignment axis (Y) of the pair which is perpendicular to a corresponding main rotation axis (X) thereof.

2. The chain of claim 1, wherein at least some of the spacers (13a, 13b) are a protuberance extending from an end portion of an internal plate toward one or more locations within the periphery of an end portion of an external plate.

3. The chain of claim 1, wherein at least some of the spacers (13a, 13b) are a protuberance extending from an end portion of an external plate toward one or more locations within the periphery of an end portion of an internal plate.

4. The chain of claim 1, wherein at least some of the spacers (13a, 13b) are an end portion of an external plate being bent out of the plane of the external plate toward the adjacent end portion of an internal plate.

5. The chain of claim 1, wherein at least some of the spacers (13a, 13b) are an end portion of an internal plate being bent out of the plane of the internal plate toward the adjacent end portion of an external plate.

6. The chain of claim 1, wherein at least some of the spacers (13a, 13b) are located in proximity of an edge of an internal plate or of an external plate.

7. The chain of claim 1 wherein at least some of the spacers (13a, 13b) exhibit a convex conformation.

8. The chain of claim 1, wherein at least some of the spacers (13a, 13b) exhibit a convex conformation having a spherical profile.

9. The chain of claim 1, wherein at least some of the spacers (13a, 13b) are defined by a convex swelling obtained by plastic deformation.

10. The chain of claim 4, wherein the end portion of the bent external plate comprises three sections, an upper section bent out of plane toward the adjacent end portion of an internal plate, a lower section bent out of plane toward the adjacent end portion of an internal plate, and a central unbent section parallel to the adjacent end portion of an internal plate.

11. The chain of claim 4, wherein, with respect to the end portion of the bent external plate, said end portion comprising an upper half and a lower half, said upper half being bent out of plane toward the adjacent end portion of an internal plate and the lower half being bent out of plane toward the adjacent end portion of an internal plate.

12. The chain of claim 1, further comprising swellings (14a, 14b) which are solidly connected to the external plates (4, 5) of each external link (2) and are arranged centrally thereon, the swellings (14a, 14b) projecting internally of a chamber (15) defined between the external plates (4, 5) and being of a dimension which reduces a breadth of the chamber (15) at central portions (4c, 5c) of the external plates (4, 5).

13. The chain of claim 12, wherein the swellings (14a, 14b) exhibit a convex conformation.

14. The chain of claim 12, wherein the swellings (14a, 14b) are obtained by plastic deformation.

15. The chain of claim 12, wherein the swellings (14a, 14b) are of a dimension which reduces the breadth of the chamber (15) at central portions (4c, 5c) of the external plates (4, 5) to a breadth of a like chamber (16) comprised between the internal plates (7, 8).

16. The chain of claim 12, wherein the swellings (14a, 14b) are defined by shaped elements connected to central portions (4c, 5c) of the external plates (4, 5).

17. The chain of claim 1, wherein each rotation pivot (6) exhibits a barrel shape having a generally cylindrical surface but also having a raised annular band around the midsection of the barrel, the raised annular band having an arc-shape in cross-section profile, the respective bush (9) exhibiting a seating (9a) having a straight profile.

18. The chain of claim 1, wherein each bush (9) exhibits a seating (9a) having a projecting profile which is annular and which is located on the inner surface of the bush (9) facing the respective rotation pivot (6), the respective rotation pivot (6) exhibiting a straight cylindrical shape having a straight profile.

19. The chain of claim 1, wherein each rotation pivot (6) exhibits a barrel shape having a generally cylindrical surface but also having an annular element (20) around the midsection of the barrel providing a raised curved surface extending toward the respective the bush (9), the respective bush (9) exhibiting a seating (9a) having a straight profile.

20. The chain of claim 18, wherein the projecting profile is defined by an annular element (20) projecting from the surface of the seating (9a) of the bush (9) and the respective rotation pivot (6) has a straight profile.

21. The chain of claim 12, wherein the swellings (14a, 14b) exhibit a convex conformation having a spherical profile.

* * * * *